Jan. 31, 1961 C. C. PRICE 2,969,935

CONVERTIBLE AIRCRAFT

Filed Sept. 9, 1957

4 Sheets-Sheet 1

INVENTOR,
Carl C. Price.
BY [signature]
Attorney

Jan. 31, 1961 C. C. PRICE 2,969,935

CONVERTIBLE AIRCRAFT

Filed Sept. 9, 1957 4 Sheets-Sheet 2

INVENTOR,
Carl C. Price.
BY [signature]
Attorney

Jan. 31, 1961 C. C. PRICE 2,969,935

CONVERTIBLE AIRCRAFT

Filed Sept. 9, 1957 4 Sheets-Sheet 3

INVENTOR,
Carl C. Price.
BY
Attorney

Jan. 31, 1961

C. C. PRICE

CONVERTIBLE AIRCRAFT 2,969,935

Filed Sept. 9, 1957

4 Sheets-Sheet 4

INVENTOR,
Carl C. Price.
BY [signature]
Attorney 2,969,935

CONVERTIBLE AIRCRAFT

Carl C. Price, Los Angeles, Calif.
(720 4th Ave., San Diego, Calif.)

Filed Sept. 9, 1957, Ser. No. 682,672
9 Claims. (Cl. 244—7)

This invention relates generally to airplanes and relates more particularly to airplanes capable of vertical ascent and descent during take-off and landing operations and also capable of horizontal flight and orthodox maneuvers while in flight.

While the invention has special utility in connection with airplanes having jet engines and the like, it is to be understood that its utility is not confined thereto, as said invention may be used in connection with airplanes using the propeller type of propulsion or the like.

Aircraft designed primarily for horizontal flight require large landing and take-off areas. Helicopters, on the other hand, have the advantage of high maneuverability and the ability to take-off and land in restricted areas but are not very efficient in forward flight.

It is, therefore, an object of the present invention to provide an aircraft which may be converted from helicopter performance for take-off to airplane performance in forward flight and, conversely, from air plane performance to helicopter performance for landing.

Another object of the invention is to provide mechanism whereby to effect the transition between helicopter and airplane operations and, vice versa, in a smooth and effective manner.

Still another object of the invention is to provide an aircraft of this character capable of hovering flight and yet capable of very high speed forward.

A further object of the invention is to provide, in mechanism of this character, effective control means for moving the power plants between horizontal and vertical positions.

A still further object of the invention is to provide mechanism or apparatus of this character having hydraulic-actuating means for moving said power plants between said horizontal and vertical positions.

Still another object of the invention is to provide mechanism of this character having electrical means for controlling certain of the hydraulic-actuating mechanism.

Still another object of the invention is to provide mechanism of this character having automatic means for locking the power plants in various positions and for automatically unlocking same when their positions are to be changed.

A further object of the invention is to provide motors or power plants mounted for movement between the horizontal and vertical positions independently of each other but having their movements synchronized.

A still further object of the invention is to provide an improved hydraulic motor or actuator for moving the aircraft power plants between the horizontal and vertical positions.

The characteristics and advantages of the invention are further sufficiently referred to in connection with the following detailed description of the accompanying drawings with respect to certain arrangements. After considering these examples, skilled persons will understand that variations may be made without departing from the principles disclosed, and any structures, arrangements or modes of operation that are properly within the scope of the appended claims are contemplated.

Referring to the drawings.

Figures 1, 2, 3, 4:
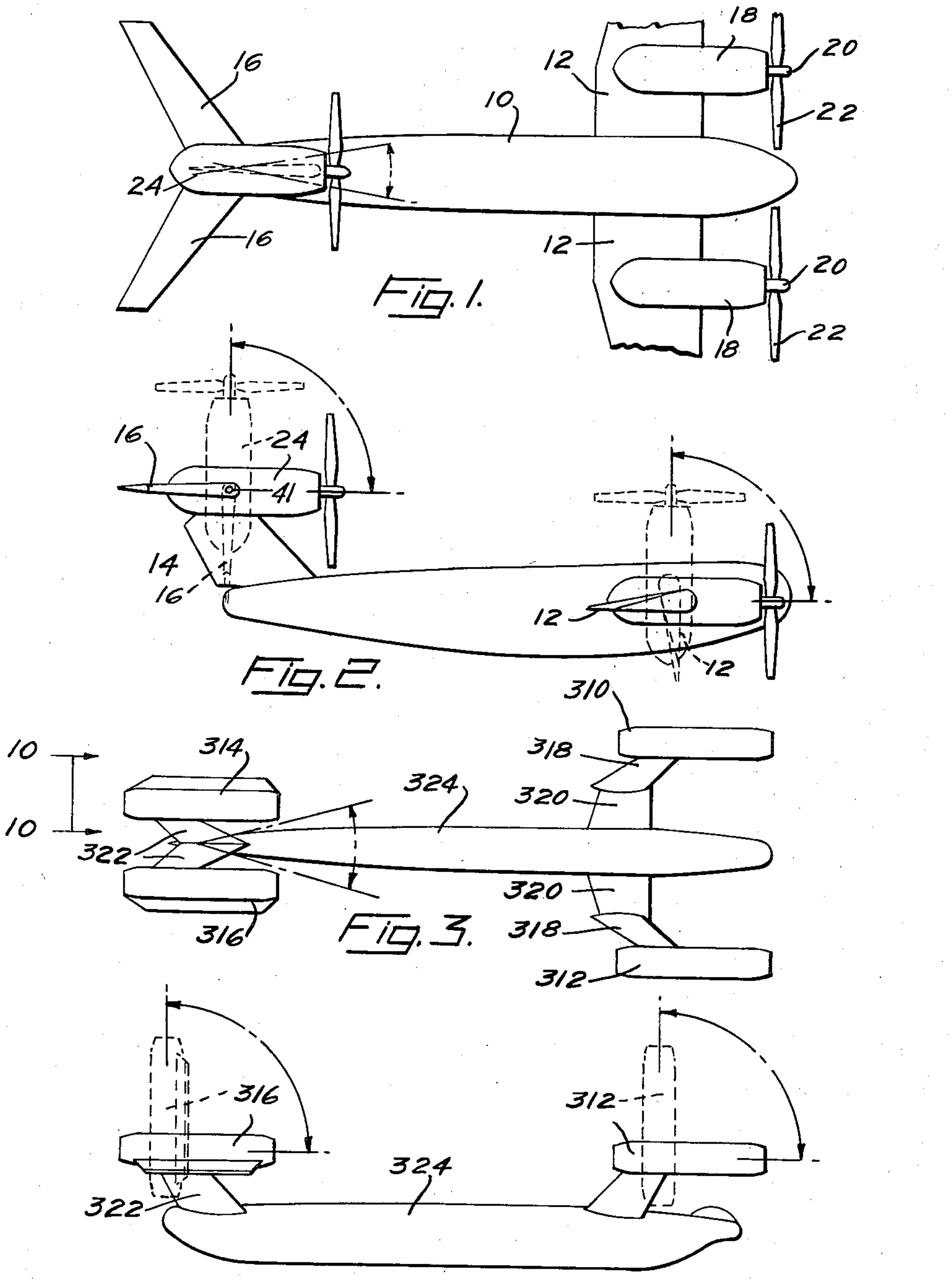
Fig. 1 is a plan view of an airplane having the propeller type of propulsion, the motors being shown in the horizontal position.
Fig. 2 is a side view of the same showing how the motors may be moved to vertical positions for helicopter performance.
Fig. 3 is a plan view of an aircraft provided with jet type of propulsion.
Fig. 4 is a side view of the same showing how the motors may be moved to vertical position for helicopter performance.
Figures 14, 15:
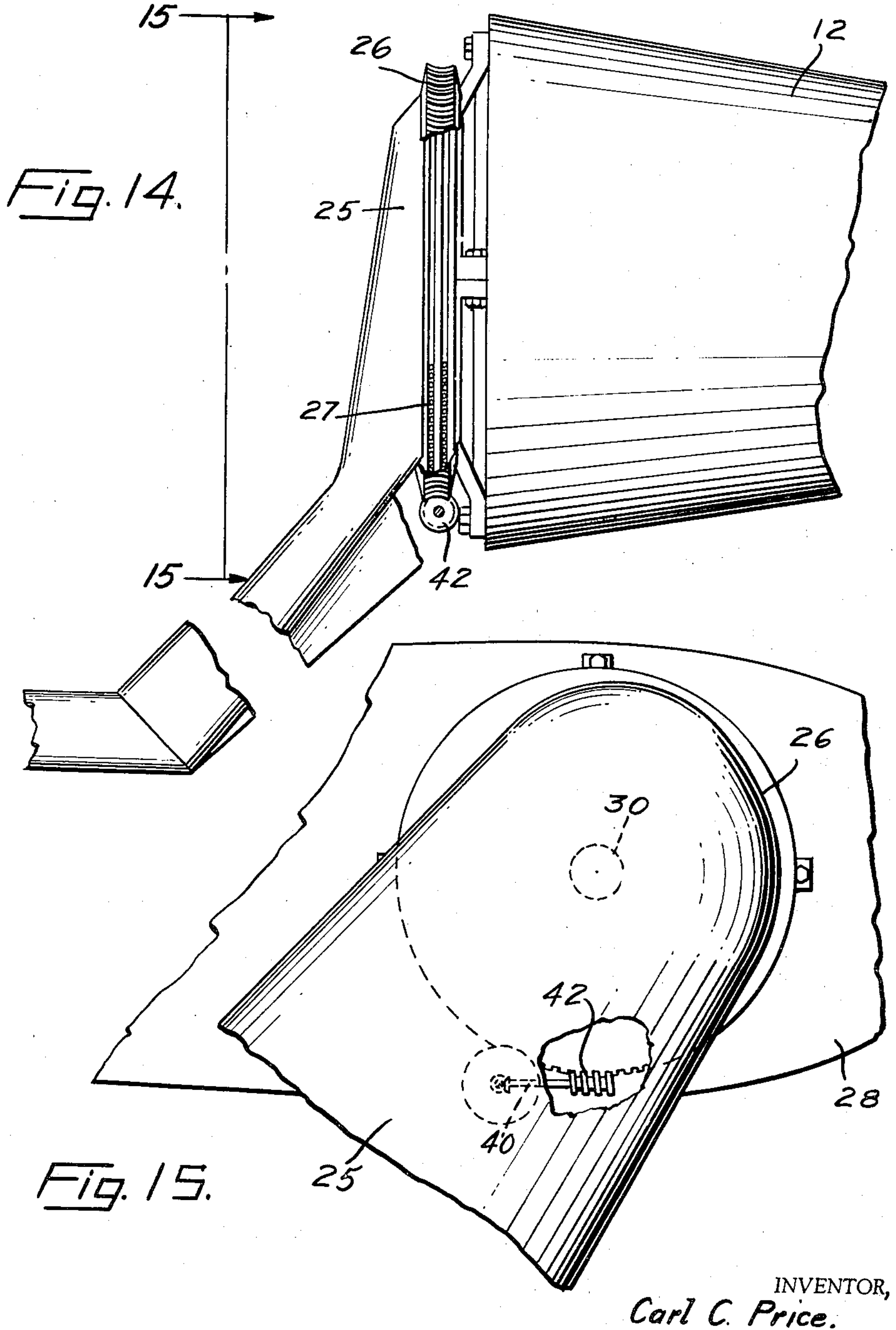
Fig. 14 is an enlarged side view of the wing mounting.
Fig. 15 is a view from line 15—15 of Fig. 14.

Referring more particularly to the drawings, there is shown, Figs. 1 and 2, an aircraft having a fuselage 10 with wings 12, a vertical fin 14 at the rear, and horizontal stabilizers 16. At each side of the fuselage there is an engine nacelle 18 with an engine therein secured to the respective wings 12, and extending forwardly thereof. The nacelles house the forward power plants or engines which have a forwardly projecting drive shaft 20 respectively on which is secured the usual propeller 22. The nacelles 18 are fixed to the respective wings which are adapted to pivot on a horizontal axis. There is also an engine nacelle 24 at the rear of the fuselage with an engine therein. Each wing is connected to a gear 26, Figs. 12, 14 and 15, which is rotatably mounted in suitable bearings 27, Fig. 14, provided therefor in support means 25 in the fuselage, the wing frame structure being shown at 28 in Fig. 15.

Each wing is rotatable on its axis 30 independently of the other and the gear 26 is adapted to be rotated by means of a hydraulic actuator 32 having a drive shaft 34 to which is connected a bevelled gear 36 which is meshed with a complementary bevelled gear 38 attached to a shaft 40 having a worm gear 42 thereon which meshes with the gear 26. The rear engine nacelle and engine is mounted on a horizontal shaft 41 pivotally mounted to suitable support means of the fuselage, the stabilizers 16 being fixed on said nacelle 24 and movable therewith, said stabilizers extending longitudinally of said nacelle 24. The nacelle 24 and motor therein may be mounted to the tail end of the fuselage by supports similar to 25.

Figures 5, 6:
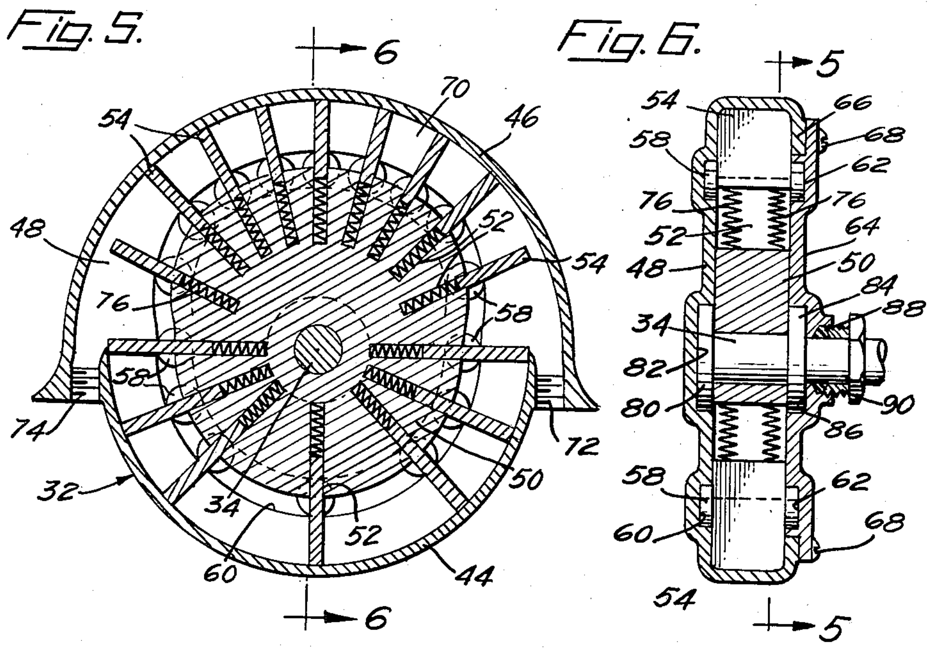
Fig. 5 is a sectional view of one of the hydraulic actuators for moving the motors of the aircraft between horizontal and vertical position, said section being taken on line 5—5 of Fig. 6.
Fig. 6 is a sectional view taken on line 6—6 of Fig. 5.
Figure 8:
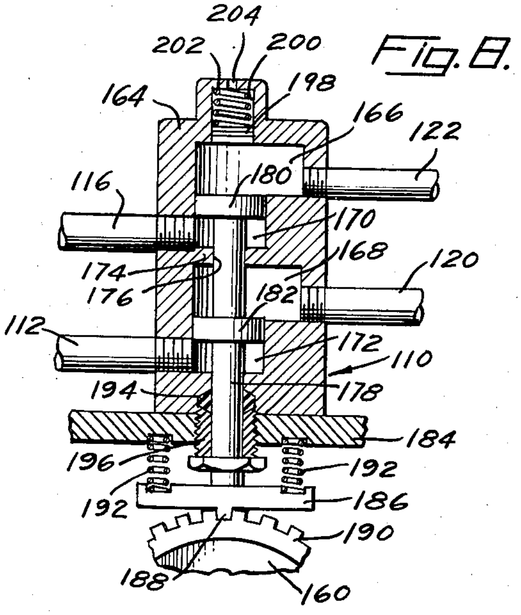
Fig. 8 is a longitudinal section through the releasable locking mechanism for releasably locking the respective motors in various adjusted positions.

Each of the actuators 32 comprises a casing having a portion 44 coaxial with the shaft 34 and a part 46 eccentric with respect to said shaft. The casing is closed by an end wall 48 and said casing is generally C-shaped in diametric cross-section, as best shown in Fig. 6. Within the casing is a rotor 50 eccentrically mounted on the shaft 34 with the lower portion as shown in Fig. 5, adjacent the interior surface of the wall portion 44 and the upper portion spaced from the wall portion 46. The rotor 50 has a plurality of radial slots 52 which extend laterally therein and in which are slidably received respective vanes 54. At each side of each vane, and integral therewith, is a disk bearing 58. At one side the disk bearings 58 are received in a cam groove 60 in the wall 48, the bearing 58 at the opposite side being received in a corresponding groove 62 formed in a cover plate 64 which is secured adjacent its periphery to the inturned flange 66 of the C-shaped casing by means of screws 68. The lower portion of the grooves 60 and 62 are concentric with the arcuate casing portion 44 and the upper portions of said grooves are concentric with the casing portion 46, there being an intermediate connecting part for each of said grooves. The pressure chamber is confined between the upper parts of the rotor 50 and the casing portion 46, there being means, comprising internally threaded ports, for connecting the opposite ends of said chamber to a source of hydraulic pressure fluid, one of said connecting means being indicated at 72 and the other at 74.

Each of the vanes 54 are urged outwardly by springs 76 disposed in the slots 52 and as the rotor 50 rotates the vanes 54 are moved inwardly and outwardly with respect to said rotor by the cam grooves 60 and 62. It is to be noted that when the vanes 54 are at the lower part of the motor, they are retracted into the rotor 50 and the ends thereof are adapted to ride on the inner surface of the arcuate portion 44 of the casing. Assuming the rotor is moved in a clockwise direction, the respective vanes as they reach the intermediate connecting portions of the grooves 60 and 62 are caused to move downwardly and when they have passed into the upper portion of said grooves they are moved to their fully extended position whereat the outer ends engage the arcuate part 46 of the casing. Hydraulic pressure entering the port 74 will force the vanes, and hence the rotor, in a clockwise direction and said fluid will pass out of the port 72 as respective vanes are drawn inwardly of the rotor 50 by the grooves 60 and 62 at the intermediate connection portions thereof. By the time the vanes have reached the adjacent end of the arcuate portion 44 of the casing they have been fully retracted to ride on the inner surface thereof. Should counterclockwise movement be desired for the rotor 50, pressure fluid will be supplied to the port 72 and will be discharged at the port 74, the action of the respective parts of the device being the same but in reverse order relative to that hereinabove described.

The rotor 40 is mounted on shaft 34, and at one end said shaft is provided with an enlarged portion 80 rotatably mounted in a recessed bearing portion 82 formed in the wall 48. At the opposite side said shaft is provided with an enlarged portion 84 which is rotatable in a similar bearing recess 86 in the cover plate 64. Packing 88 is provided for the projecting portion of the shaft 34 and there is a packing nut 90 thereon for securing said packing.

Figure 9:
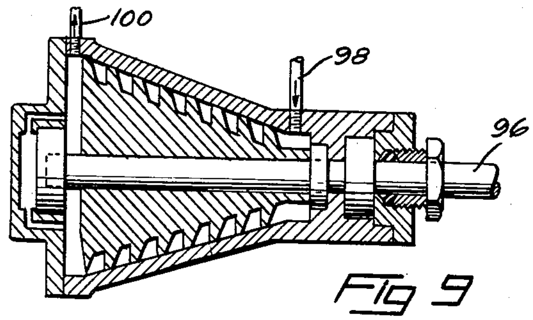
Fig. 9 is a longitudinal section through a hydraulic pump for supplying hydraulic pressure to the hydraulic system.
Figure 10:
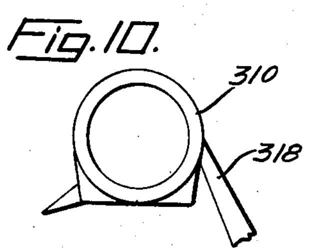
Fig. 10 is an end view of one of the jet motors as seen from the line 10—10 in Fig. 3.
Figures 11, 12:
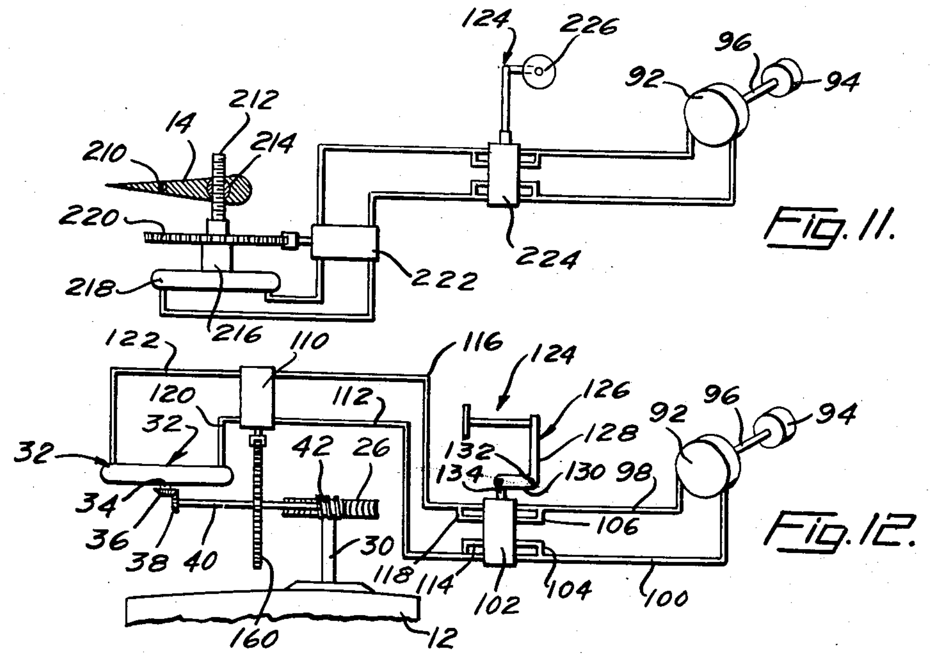
Fig. 11 is a diagrammatic view of a portion of the hydraulic system.
Fig. 12 is a diagrammatic view of another portion of the hydraulic system.

Pressure fluid is provided by a pump 92, Fig. 12, driven by any suitable means such as a motor 94 to which said pump is connected by a shaft 96. An independent motor 94 may be used, or if desired, the pump may be connected to any other suitable source of power. The pump shown particularly in Fig. 9 has an inlet 98 and an outlet 100, it being understood, of course, that any suitable type of fluid pressure developing pump may be used.

Figure 7:
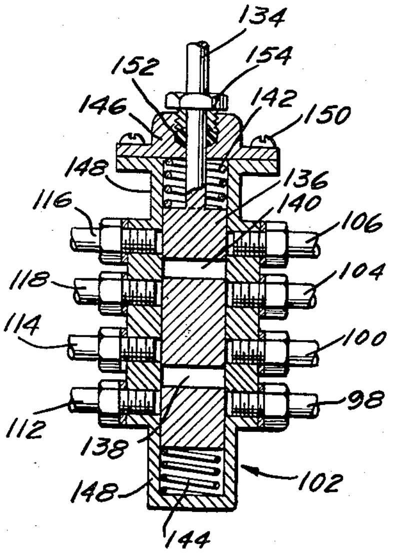
Fig. 7 is a longitudinal section through one of the hydraulic control valves.

The outlet conduit 100 leads to a valve 102, shown in detail in Fig. 7. Conduit 100 has a branch conduit 104 which is also connected to the valve 102. Conduit 98, which leads from the valve 102 to the pump 92 has a branch 106 so that there are two return conduits from the valve 102 to the pump as well, as two supply conduits to said valve. Valve 102 is connected to a locking device 110 for locking respective wings in various adjusted positions. The valve 102 is connected to the locking device by means of a conduit 112 which has a branch 114 so that the lower connections at one side of the valve 102 are connected at one side of the locking device. The valve 102 has a connection 116 with said locking device and a branch connection 118. The locking device has connections 120 and 122 with the actuator 32, said connections being with the ports 72 and 74 respectively.

Manual control means is provided for the valve 102 and includes the usual control mechanism, indicated generally at 124 of the aircraft. This mechanism has a bell crank lever 126 with an upright arm 128 and a lateral arm 130, and said bell crank lever 126 is pivoted at 132. The free end of arm 130 is connected to the stem 134 of the movable valve element 136 of said valve 102. It is to be noted that the movable valve element 136 has a pair of transverse passages 138 and 140 which are spaced apart longitudinally of said movable valve element.

Valve element 136 is yieldingly held in a neutral position whereat the transverse ports 138 and 140 are out of alignment with any of the connections of said valve 102, the means for thus normally positioning valve element 136 includes a spring 142 at the upper end of the valve element 136, disposed about the stem 134, and a spring 144 at the opposite end of said valve element. These springs urge the valve element in opposite directions with substantially equal force and are adapted to maintain said element in the above neutral position when said element is free of pressure in either direction.

Means for packing the valve stem 134 comprises a cap 146 secured to the upper end of the casing 148 of said valve element 102 by means of screws 150 or the like and there is a packing 152 about said stem which is held in place by a packing nut 154 and which is adapted to exert pressure on said packing 152 to cause same to sealingly engage the valve stem 134.

The actuators 32 and respective wings with attached nacelles 18 and motors therein, and the nacelle 24 with its motor are releasably locked in adjusted positions by means of respective toothed wheels 160 and releasable locking mechanisms 110 each of which comprises a casing 164 having a pair of chambers 166 and 168 in longitudinally-spaced relationship. There is a bore 170 below the chamber 166 and communicating therewith and a bore 172 beneath the chamber 168 and communicating therewith, said bores 170 and 172 being in axial alignment. A partition 174 separates the bore 170 from the chamber 168 and is provided with an opening 176 therein aligned with the chambers 170 and 172 for reception of a stem 178 which carries a pair of axially spaced pistons 180 and 182 which are operatively received in the bores 170 and 172. Bores 170 and 172 are connected with the conduits 116 and 112 respectively below the pistons 180 and 182 and the chambers 166 and 168 are connected with the conduits 120 and 122. The valve body 164 is connected by any suitable means, not shown, to a support 184 and the stem 178 extends outwardly of said support. The outer end of the stem 178 is provided with a member 186 having a tooth 188 thereon for engagement with the teeth 190 on the wheel 160. The member 186 is urged into engagement with the wheel 160 by means of springs 192 which react between the support 184 and said member 186. A packing 194 and packing gland 196 therefor provides a seal for the stem 178 to prevent loss of fluid from the valve. A pressure relief means is provided and comprises a piston 198 in a bore 200 at the upper end of the chamber 166 to compensate for excess pressure in the chamber 166. Piston 198 is urged toward chamber 168 by a spring 202 and there is a vent opening 204 for said bore 200.

In operation, the control 124 may be actuated to raise or lower the valve member 136 to effect rotation in one direction or the other of the actuator 32. Should the control 124 be actuated to move the stem 134 downwardly passages 138 and 140 are moved downwardly to connect conduits 98 and 112 together and conduits 104 and 118 together to permit circulation of fluid from the pump through the locking means 162 and actuator 32 and back to the pump. When the fluid pressure from the conduit 112 is applied to the underside of the piston 182 said piston, stem 178 and piston 180 move upwardly to effect release of the wheel 160 so that the actuator 32 may actuate the worm 42 and gear 26 and hence actuate the wing and its attached motor. When the pistons 182 and 180 are in their uppermost position it will be obvious that fluid will flow through the device, the return flow being through the conduit 122, chamber 166, bore 170 and conduit 116. Should the control 124 be actuated in the opposite direction the fluid pressure will circulate in the opposite direction and the locking mechanism 162 will be again actuated to permit circulation therethrough and to effect release of the wheel 160. Under these conditions, the pressure fluid will enter the chamber 170 from the conduit 116 and effect upward movement of the piston 180 to permit fluid flow to the conduit 122 and hence to the actuator 32. The return flow will be through the conduit 120, chamber 168, bore 172 and conduit 112.

The vertical fin 14 is pivoted at 210 and is actuated by means of a screw 212 operatively received in a nut 214 secured in the fin 14 and adapted to rotate on a vertical axis to permit full operative movements of said fin. The screw 212 has one end rotatably mounted in a bearing 216 carried by an actuator 218 which is of similar construction to the actuator 32 hereinabove described. There is a toothed wheel 220 secured to the screw and a releasable locking mechanism 222 is provided to releasably lock said wheel 220 in adjusted positions. The mechanism 222 is of the same construction and operation as the mechanism 110. A valve 224 is connected into the hydraulic system used for operating the actuator 218. The valve 224 is controlled by the control mechanism 124 but actuation of said valve 224 is effected by rotation of the wheel 226 of said control 124.

The mechanism shown in Fig. 12 is used to control the master unit. There is also means for controlling slave units and said means comprises an electrical system shown in Fig. 13.

This electrical system includes a source of electrical power of any suitable character but shown as a battery 230 having one side connected to a movable switch member 232 by means of a wire 234, said switch member 232 being connected to and operable by the control 124. The movable switch member 232 is adapted to contact one or the other of fixed contacts 236 and 238. The contact 236 is connected with a solenoid 240 by means of a circuit wire 242 having interposed therein a normally closed switch 244. The solenoid 240 is also connected to the opposite side of the battery 230 by means of a wire 246. Fixed contact 238 is connected to a solenoid 248 by means of a circuit wire 250 having interposed therein a normally closed switch 252. Magnet 248 is also connected with the opposite side of the battery 230 by means of a wire 254 which is connected to the wire 246. The solenoids 240 and 248 are arranged on opposite sides of a lever 258 pivoted at one end, as at 260, and having the opposite end connected to the stem 262 of a valve mechanism 102 which controls the fluid pressure to the motor 32 of the opposite wing and motor, said opposite motor being a slave mechanism.

Switches 244 and 252 are adapted to be opened by means of solenoids 270 and 272 respectively. The solenoid 270 has a connection 274 with the wire 242 between switch 244 and the switch actuated by the control member 124. The solenoid 272 is connected to the wire 250 by a connection 276 between the switch 252 and said switch actuated by said control mechanism. Solenoid 270 is connected by a wire 278 to a switch member 280 of a synchronizing switch, indicated generally at 282. Likewise solenoid 272 is connected to said member 280 by means of a wire 286 and a portion of the wire 278. The synchronizing switch 282 has a series of contacts 288 and the movable switch member 280 is adapted to be actuated to successively contact in either direction said contacts 288 by means of a shaft 290 which is connected to the shaft 34 of the slave actuator 32 for said other wing and engine of the plane. There is a second synchronizing switch, indicated generally at 292 which has a movable switch member 294 connected to a shaft 296 which, in turn, is connected to the actuator 32 of the master control system. Switch member 294 is connected by a wire 298 to the wire 234 which leads to the battery 230, and there are a series of six contacts 300 for said synchronizing switch 292. The contacts 300 are connected to respective contacts 288 of the switch 282 and it is to be noted that as the movable switch members 294 and 280 are actuated the contact just ahead of the switch member 280 is connected to the battery through the switch member 294 and wire 298. Should the slave actuator 32 run faster than the master actuator 32 the contact 280 will contact a fixed contact 288 that is carrying current and will thus complete the circuit to one or the other of the solenoids 270 or 272 depending upon direction of operation of the system upon energization of one or the other of said solenoids 270 and 272. More particularly should control 124 be actuated to contact switch member 236 solenoid 240 will be energized to effect actuation of the valve mechanism 102 so that the slave actuator 32 will start to operate simultaneously with the actuation of the valve mechanism 102 of the master system which is also controlled by the control 124. Now should the slave actuator overrun the master actuator 32 the circuit to the solenoid 270 will be closed to effect opening of switch 244 so as to deenergize solenoid 240. This will result in the return to the neutral position of the valve mechanism 102 of the slave system until the master actuator has caught up with the slave actuator at which time the switch member 294 will have advanced sufficiently so as to cut off the current to the solenoid 270 because the contact 288 which had been carrying current through the movable contact 280 has been cut off and the contact 288 ahead of the same has been connected to the battery.

The mechanism will operate in the opposite direction in the same manner as above described. It is to be noted that there is a segment 302 of the shaft 290 which is cut away so as to provide a certain amount of lost motion between the side of said segment that has been engaged with the switch member 280 when the shaft 290 is operating in one direction and the opposite side of said segment. When the actuators 32 are operated in the opposite direction this lost motion is taken up and the switch member 280 will be actuated in the opposite direction so that it will be positioned to successively contact one fixed contact 288 behind the respective contacts 300 engaged by the movable switch member 294. When operating in the opposite direction an overrunning of the slave actuator 32 will result in the closing of the circuit to the solenoid 272 to thereby open switch 282 and deenergize solenoid 248 to permit the valve mechanism 102 to return to the normal position until the master actuator 32 has caught up with said slave actuator 32.

Figure 13:
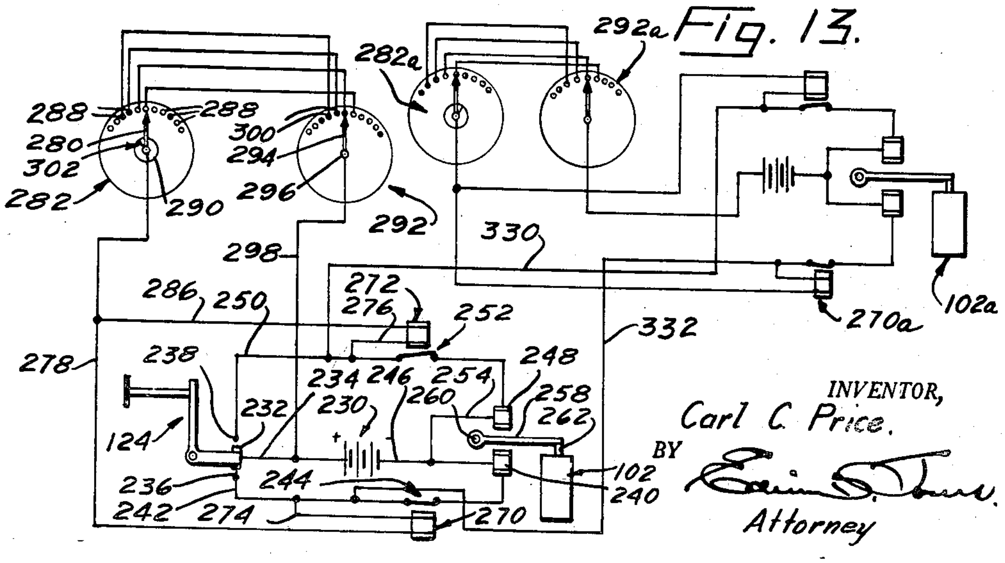
Fig. 13 is a wiring diagram of the electrical system.

The control of the pivoting movements of the rear nacelle and motor therein is effected by means of the electrical system shown at the top of Fig. 13 and connected into the above described electrical system by means of wires 330 and 332 which supply electric power from the battery 230 to the electrical system for said rear motor. The various parts of the electrical system for the rear motor are given the same reference numerals as those of the above described electrical system but with an "*a*" added.

As the electrical system for the rear motor operates as that for the front motors a detailed description of its operation is unnecessary. However, it is to be noted that the synchronizing switch **292*a* is driven by the master actuator 32 and the synchronizing switch 282*a* is connected to the pivotal shaft for the rear motor or the shaft of the actuator 32** for said rear motor.

The aircraft shown in Figs. 3 and 4 is a jet powered arrangement having jet engines 310, 312, 314 and 316. Motors 310 and 312 are connected by members 318 to short wings 320, the mounting of said motors being similar to the arrangement shown in Fig. 14. The motors 314 and 316 are mounted on members 322 at the rear of the fuselage 324. The motors 310, 312, 314 and 316 all pivot on a horizontal axis independent of each other and one of said motors is a master motor and has a master hydraulic system controlling same as in the arrangement hereinabove described, the other motors being slave motors and being controlled by mechanism such as has been hereinbefore described in connection with the slave motors.

From the foregoing it is believed that it will be apparent that the control 124 is adapted to control not only the master control system but the control systems of the slave mechanisms.

It is thought that the invention and many of its attendant advantages will be understood from the foregoing description and it is thought that it will be apparent that various changes may be made in the form, construction and arrangement of the parts of the invention and the method of operation thereof without departing from the spirit and scope thereof or sacrificing all of its material advantages, the arrangements hereinbefore described being merely for purposes of illustration.

What I claim is:

1. A convertible aircraft, comprising: a fuselage, oppositely extending wings adjacent the forward end of said fuselage; propulsion motors on said wings; pivotal means connecting said wings to said fuselage whereby said wings may rotate on a horizontal axis independently of each other; a master hydraulic actuator for rotating one of said wings; a hydraulic slave actuator for rotating the other wing; a hydraulic system for each of said motors, each system including a source of pressure fluid, valve means for controlling the direction of rotation of said actuator; a normally locked releasable hydraulically operated locking means for locking the respective wing in adjusted position, said locking means being moved to the released position by pressure fluid supplied to the respective hydraulic actuator for actuation of same in either direction; manual control means for the valve means of the master hydraulic system; an electrical system controlled by said manual control means, said electrical system including means for actuating the valve mechanism of the hydraulic slave system in either direction according to the direction of rotation of the master hydraulic actuator; and means for keeping said actuators in synchronism when actuating the respective wings.

2. A convertible aircraft, comprising: a fuselage, oppositely extending wings adjacent the forward end of said fuselage; propulsion motors on said wings; pivotal means connecting said wings to said fuselage whereby said wings may rotate on a horizontal axis independently of each other; a master hydraulic actuator for rotating one of said wings; a hydraulic slave actuator for rotating the other wing; a hydraulic system for each of said motors adapted to be connected to a source of pressure fluid, valve means for controlling the direction of rotation of said actuator, a normally locked releasable locking means for locking the wings in adjusted positions, said locking means being moved to the released position by pressure fluid supplied to the respective hydraulic actuator for actuation of same in either direction; manual control means for the valve means of the master hydraulic system; an electrical system controlled by said manual control means, said electrical system including means for actuating the valve mechanism of the hydraulic slave system in either direction according to the direction of rotation of the master hydraulic actuator; and means for keeping said actutors in synchronism when said actuators are operating.

3. A convertible aircraft, comprising: a fuselage, oppositely extending wings adjacent the forward end of said fuselage; propulsion motors on said wings, said motors driving propellers, pivotal means connecting said wings to said fuselage whereby said wings may rotate on a horizontal axis independently of each other; a master hydraulic actuator for rotating one of said wings; a hydraulic slave actuator for rotating the other wing; a hydraulic system for each of said motors, each system including a source of pressure fluid, valve means for controlling the direction of rotation of said actuator, a normally locked releasable locking means for locking the respective wings in adjusted positions, said locking means being moved to the released position when pressure fluid is supplied to the respective hydraulic actuators for actuation of same in either direction; manual control means for the aircraft, said manual control means controlling said valve means of the master hydraulic system; an electrical system controlled by said manual control means, said electrical system including means for actuating the valve means of the hydraulic slave system in either direction according to the direction of rotation of the master hydraulic actuator; and means for keeping said actuators, and hence said motors, in synchronism when said actuators are operating.

4. A convertible aircraft, comprising: a fuselage, oppositely extending wings adjacent the forward end of said fuselage; jet engines on said wings; pivotal means connecting said engines to said wings whereby said engines may rotate on a horizontal axis independently of each other; a master hydraulic actuator for rotating one of said engines on said axis; a hydraulic slave actuator for rotating the other engine on said axis; a hydraulic system for each of said actuators, each system being adapted to be connected to a source of pressure fluid; valve means for controlling the direction of rotation of said actuator; a normally locked releasable locking means for locking the engines in adjusted positions, said locking means being moved to the released position when pressure fluid is supplied to the respective hydraulic actuator for actuation of same in either direction; manual control means for the aircraft, said manual control means controlling said valve mechanism of the master hydraulic system; an electrical system controlled by said manual control means, said electrical system including means for actuating the valve mechanism of the slave hydraulic system in either direction according to the direction of rotation of the master hydraulic actuator; and means for keeping said actuators in synchronism when the latter are operating.

5. A convertible aircraft, comprising: a fuselage; oppositely extending wings adjacent the forward end of said fuselage; propulsion motors on said wings, said motors driving propellers; pivotal means connecting said wings to said fuselage whereby said wings may rotate on a horizontal axis independently of each other; a vertical vane adjacent the rear of said fuselage and mounted on a vertical axis; a propulsion motor adjacent the rear of said fuselage; pivotal mounting means for said rear motor arranged so that said motor is rotatable between a horizontal and vertical position; propellers driven by said motors; a master hydraulic actuator for rotating one of said wings; a hydraulic slave actuator for rotating the other wing; a hydraulic slave actuator for rotating said rear motor on its axis; a hydraulic actuator for said vane; a hydraulic system for each of said actuators, said systems being adapted to be connected to a source of pressure fluid, valve means for controlling the direction of rotation of said actuator, a normally locked releasable locking means for locking the actuators in adjusted positions, said locking means being moved to the released position when pressure fluid is supplied to the respective hydraulic actuators for actuation of same in either direction; manual control means for the aircraft, said manual control means controlling said valve means of the master hydraulic system with one type of movement and the valve means of the hydraulic system for the vane with another type of movement; an electrical system controlled by said manual control means, said electrical system including means for actuating the valve means of the hydraulic slave systems in either direction according to the direction of rotation of the master hydraulic actuator; and means for keeping the actuators for said motors in synchronism when said actuators are operating.

6. A convertible aircraft, comprising: a fuselage, oppositely extending wings adjacent the forward end of said fuselage; propulsion motors on said wings, said motors having propellers; pivotal means connecting said wings to said fuselage whereby said wings may rotate on a horizontal axis independently of each other; a master hydraulic actuator for rotating one of said wings; a hydraulic slave actuator for rotating the other wing; a hydraulic system for each of said actuators, each system being adapted to be connected to a source of pressure fluid, valve means for controlling the direction of rotation of the actuator of said system, a normally locked releasable locking means for locking the respective wings in adjusted positions, said locking means being moved to the released position when pressure fluid is supplied to the respective hydraulic actuators for actuation of same in either direction; manual control means for the aircraft, said manuel control means controlling said valve means of the master hydraulic system; an electrical system controlled by said manual control means, said electrical system including means for actuating the valve means of the hydraulic slave system in either direction for actuating the motor thereof according to the direction of rotation of the master hydraulic actuator; and means for keeping said actuators, and hence said motors, in synchronism when said actuators are operating.

7. A convertible aircraft, comprising: a fuselage, oppositely extending wings adjacent the forward end of said fuselage; propulsion motors on said wings pivotally mounted for rotation on a horizontal axis between a vertical and a horizontal position independently of each other; a master hydraulic actuator for rotating one of said motors; a hydraulic slave actuator for rotating the other motor; a hydraulic system for each of said actuators, each system being adapted to be connected to a source of pressure fluid, valve means for controlling the direction of rotation of said actuator, a normally locked releasable locking means for locking the respective wings in adjusted positions, said locking means being moved to the released position when pressure fluid is supplied to the respective hydraulic actuators for actuation of same in either direction; manual control means for the aircraft, said manual control means controlling said valve means of the master hydraulic system; an electrical system controlled by said manual control means, said electrical system including means for actuating the valve means of the hydraulic slave system in either direction according to the direction of rotation of the master hydraulic actuator; and means for keeping said actuators, and hence said motors, in synchronism when said actuators are operating.

8. In a convertible aircraft: a fuselage; a pair of propulsion motors mounted adjacent the forward end of said fuselage on a horizontal axis and independently of each other; a master hydraulic actuator for rotating one of said motors on its axis; a hydraulic slave actuator for rotating the other motor on its axis; a hydraulic system for each of said actuators adapted to be supplied with pressure fluid, respective valve means for controlling the direction of rotation of said actuators, said valve means being normally in a neutral position, a normally locked releasable locking means for locking the respective actuators in adjusted positions, said locking means being moved to the released position when pressure fluid is supplied to the respective hydraulic actuators for actuation of same in either direction; manual control means for the aircraft, said manual control means controlling said valve means of the master hydraulic system; an electrical system for controlling the hydraulic valve mechanism of the hydraulic slave system and having two positions for controlling the direction of operation of the hydraulic actuator of said system according to said positions; a pair of electrically operable means for moving said valve from a neutral position to one or the other of said two positions, said electrically actuated means being adapted to be connected to a source of power; a switch controlled by said manual control means and having two closed positions, said switch having a movable switch member adapted to be connected to said source of power, said switch when in one position connecting one of said electrically operable means with said source of power and when in the opposite position connecting the other of said electrically operable means with said source of power; a normally close switch between said manually controlled switch and each of the electrically operable means; an electrically operated device for each of said switches adapted to open the respective switches when energized; a pair of synchronizing switches each having a movable switch member adapted to have one end connected to a rotating shaft and a plurality of arcuately arranged and spaced fixed contacts; means connecting the movable switch member of one of said synchronizing switches to a source of electrical energy; means connecting the movable switch member of the other synchronizing switch to the electrical devices; and means connecting the respective fixed contacts of said one synchronizing switch to respective fixed contacts of the other synchronizing switch, the movable contact of said other synchronizing switch normally successively contacting the fixed contacts thereof one contact behind the movable contact member of said one synchronizing switch; and means for providing relative rotation between the movable contact member and the fixed contact members of said other synchronizing switch an amount equal to two spaces between said fixed contacts.

9. In a convertible aircraft: a fuselage; a pair of propulsion motors mounted adjacent the forward end of said fuselage on a horizontal axis and independently of each other; a master hydraulic actuator for rotating one of said motors on its axis; a hydraulic slave actuator for rotating the other motor on its axis; a hydraulic system for each of said actuators adapted to be supplied with pressure fluid, respective valve means for controlling the direction of rotation of said actuators, said valve means being normally in a neutral position, a normally locked releasable locking means for locking the respective actuators in adjusted positions, said locking means being moved to the released position when pressure fluid is supplied to the respective hydraulic actuators for actuation of same in either direction; manual control means for the aircraft, said manual control means controlling said valve means of the master hydraulic system; an electrical system for controlling the hydraulic valve mechanism of the hydraulic slave system and having two positions for controlling the direction of operation of the hydraulic actuator of said system according to said positions; a pair of electrically operable means for moving said valve from a neutral position to one or the other of said two positions, said electrically actuated means being adapted to be connected to a source of power; a switch controlled by said manual control means and having two closed positions, said switch having a movable switch member adapted to be connected to said source of power, said switch when in one position connecting one of said electrically operable means with said source of power and when in the opposite position connecting the other of said electrically operable means with said source of power; a normally closed switch between said manually controlled switch and each of the electrically operable means; an electrically operated device for each of said switches adapted to open the respective switches when energized; a pair of synchronizing switches each having a movable switch member adapted to have one end connected to a rotating shaft and a plurality of arcuately arranged and spaced fixed contacts; means connecting the movable switch member of one of said synchronizing switches to a source of electrical energy; means connecting the movable switch member of the other synchronizing switch to the electrical devices; and means connecting the respective fixed contacts of said one synchronizing switch to respective fixed contacts of the other synchronizing switch, the movable contact of said other synchronizing switch normally successively contacting the fixed contacts thereof one contact behind the movable contact member of said one synchronizing switch.

References Cited in the file of this patent

UNITED STATES PATENTS

| | | |
|---|---|---|
| 1,042,994 | Wilson | Oct. 29, 1912 |
| 1,867,963 | Blahnik | July 19, 1932 |
| 2,015,150 | Maxwell | Sept. 24, 1935 |
| 2,372,498 | Keep | Mar. 27, 1945 |
| 2,621,001 | Roman | Dec. 9, 1952 |
| 2,650,573 | Hickman | Sept. 1, 1953 |
| 2,708,081 | Dobson | May 10, 1955 |
| 2,802,153 | Bonn | Aug. 6, 1957 |
| 2,835,456 | Kaplan | May 20, 1958 |